(12) United States Patent
Pfortje et al.

(10) Patent No.: US 11,460,448 B2
(45) Date of Patent: Oct. 4, 2022

(54) COUPLING FOR ULTRASONIC INSPECTION OF PIPES

(71) Applicant: GE Sensing & Inspection Technologies GmbH, Hurth (DE)

(72) Inventors: René Pfortje, Hurth (DE); Benjamin Hoemske, Hurth (DE); Christof Breidenback, Hurth (DE); Alexander Fiseni, Hurth (DE); Stephan Falter, Hurth (DE)

(73) Assignee: GE SENSING & INSPECTION TECHNOLOGIES GMBH, Hurth (DE)

( * ) Notice: Subject to any disclaimer, the term of this patent is extended or adjusted under 35 U.S.C. 154(b) by 335 days.

(21) Appl. No.: 15/891,744

(22) Filed: Feb. 8, 2018

(65) Prior Publication Data

US 2018/0284072 A1    Oct. 4, 2018

Related U.S. Application Data

(60) Provisional application No. 62/457,348, filed on Feb. 10, 2017.

(51) Int. Cl.
*G01N 29/28* (2006.01)
*G01N 29/22* (2006.01)
*G01N 29/04* (2006.01)
G01N 29/24 (2006.01)

(52) U.S. Cl.
CPC .......... *G01N 29/28* (2013.01); *G01N 29/043* (2013.01); *G01N 29/225* (2013.01); *G01N 29/226* (2013.01); G01N 29/24 (2013.01); G01N 2291/2626 (2013.01); G01N 2291/2634 (2013.01)

(58) Field of Classification Search
CPC .... G01N 29/28; G01N 29/043; G01N 29/225; G01N 29/226
USPC ............................................................ 73/644
See application file for complete search history.

(56) References Cited

U.S. PATENT DOCUMENTS

| 5,469,744 | A   | * | 11/1995 | Patton ................... G01N 29/28 |
|           |     |   |         | 73/644 |
| 8,371,173 | B1  |   | 2/2013  | DiMambro et al. |
| 2005/0101869 | A1 | * | 5/2005 | Burba ...................... A61B 8/10 |
|           |     |   |         | 600/459 |
| 2010/0260230 | A1 | * | 10/2010 | Lane ....................... G01J 5/0011 |
|           |     |   |         | 374/209 |

(Continued)

*Primary Examiner* — Tarun Sinha
(74) *Attorney, Agent, or Firm* — Mintz Levin Cohn Ferris Glovsky and Popeo, PC; Lisa Adams (57) ABSTRACT

A wear sole, an ultrasonic inspection apparatus having a wear sole, and methods for using the same are provided. In one embodiment, the ultrasonic inspection apparatus can include a body, a wear sole, and a fluid channel. The body can define a first chamber configured to receive a first volume of ultrasonic couplant and a distal end of an ultrasonic probe. The wear sole can define a second chamber configured to receive a second volume of ultrasonic couplant and the wear sole can be removably coupled to a distal end of the body. The wear sole can also have a membrane extending thereacross for separating the first chamber from the second chamber. The fluid channel can extend through the body and the wear sole can be configured to deliver the second volume of ultrasonic couplant to the second chamber.

11 Claims, 9 Drawing Sheets

(56) References Cited

U.S. PATENT DOCUMENTS

2011/0072905 A1    3/2011   Lam et al.
2011/0120225 A1*   5/2011   Meinert .................. G01N 29/26
                                                         73/633
2011/0313293 A1*  12/2011   Lindekugel .............. A61B 8/44
                                                         600/461

* cited by examiner

COUPLING FOR ULTRASONIC INSPECTION OF PIPES

CROSS-REFERENCE TO RELATED APPLICATIONS

This application claims the benefit of U.S. Provisional Application No. 62/457,348, filed on Feb. 10, 2017, entitled "Improved Coupling for Ultrasonic Inspection of Pipes," the entirety of which is incorporated by reference.

BACKGROUND

Ultrasonic inspection can be used to non-destructively detect defects (e.g., cracks, inclusions, voids, etc.) in manufactured articles such as pipes. As an example, an ultrasonic transducer can be used to transmit ultrasonic waves (sound waves) into the pipe and these transmitted ultrasonic waves can reflect from boundaries within the pipe (e.g., defects and outer boundaries) back to the ultrasonic transducer. The properties of the reflected ultrasonic waves can be measured by the ultrasonic transducer and subsequently analyzed to identify characteristics of defects detected within the pipe, including location and size.

During inspection, ultrasonic transducers can be distanced from the pipe to avoid wear and dirt accumulation. Because ultrasonic waves are not effectively transmitted through air at the ultrasonic frequencies used in non-destructive testing, an ultrasonic couplant (e.g., a liquid or gel) is typically provided within a space between the transducer and the pipe to facilitate transmission. When the ultrasonic transducer is moved to a new location, the ultrasonic couplant drains from this space and is refilled before inspection is continued. While the delay incurred due to an individual filling is relatively modest (e.g., about 5 sec), it can add up to hours in a high-throughput pipe manufacturing environment, where hundreds to thousands of pipes are tested daily.

SUMMARY

In general, systems and methods are provided for ultrasonic testing of materials.

In one embodiment, a probe holder configured to receive an ultrasonic probe is provided and can include a body, a wear sole, and a fluid channel. The body can define a first chamber configured to receive a first volume of ultrasonic couplant. In certain embodiments, the first chamber can also be configured to receive a distal end of an ultrasonic probe. The wear sole can define a second chamber configured to receive a second volume of ultrasonic couplant and it can be removably coupled to a distal end of the body. The wear sole can also have a membrane extending thereacross for separating the first chamber from the second chamber. The fluid channel can extend through the body and the wear sole and it can be configured to deliver the second volume of ultrasonic couplant to the second chamber.

The wear sole can have a variety of configurations. In one embodiment, the wear sole can include an aperture extending between a proximal facing surface and a distal facing surface and the membrane can be positioned within the aperture. In certain aspects, the membrane can be configured to propagate ultrasonic waves therethrough.

The second chamber can have a variety of configurations. In one embodiment, at least a portion of the second chamber can be aligned with the first chamber. In certain aspects, a volume of the second chamber can be less than a volume of the first chamber.

In another embodiment, a distal side of the wear sole can be configured to mate with a pipe.

In another embodiment, the wear sole can include a lateral tab and the body can include a slot formed laterally adjacent to the distal end. The slot can be configured to receive the lateral tab.

In another embodiment, a wear sole for ultrasonic inspection is provided and can include a frame configured to removably mate to a probe holder body. The frame can have an aperture extending therethrough between a proximal facing surface and a distal facing surface. A membrane can extend across the aperture and it can be configured to propagate ultrasonic waves therethrough. The frame can also have a fluid delivery channel formed therein for delivering an ultrasonic couplant to a portion of the aperture distal to the membrane.

The frame can have a variety of configurations. In one embodiment, the frame can include a lateral tab configured to engage a corresponding slot in the probe holder body. In certain aspects, a distal facing surface of the frame can be configured to mate with a pipe. In another aspect, the frame can be configured to direct the flow of ultrasonic couplant along at least a portion of the length of the membrane.

In another embodiment, the membrane can be proximally offset from the distal facing surface of the frame.

In another embodiment, the fluid delivery channel can be configured to direct a flow of ultrasonic couplant from a first side of the frame to a second side of the frame opposite to the first side of the frame.

In another embodiment, a method of ultrasonic inspection is provided and can include removably coupling a wear sole to a distal end of a probe holder, positioning the probe holder in contact with a pipe via the wear sole, filling a first chamber in the probe holder with a first volume of ultrasonic couplant, and filling a second chamber extending between the wear sole and the pipe with a second volume of ultrasonic couplant. The first and second chambers can be separated by a membrane, and the second volume of ultrasonic couplant can be in fluid contact with the pipe. The method can further include propagating ultrasonic waves from an ultrasonic transducer in the probe holder, through the first volume of ultrasonic couplant, through the membrane, and through the second volume of ultrasonic couplant to the pipe.

In another embodiment, the membrane can extend across an aperture in a frame of the wear sole, and the method can further include removing and replacing the wear sole with a new wear sole having a membrane extending thereacross for separating the first and second chambers.

In another embodiment, the first volume of ultrasonic couplant in the first chamber can be greater than the second volume of ultrasonic couplant in the second chamber.

In other aspects, the first volume of ultrasonic couplant in the first chamber can remain substantially constant and the second volume of ultrasonic couplant can be continuously delivered to the second chamber to fill the second chamber.

In another embodiment, the second volume of ultrasonic couplant can be delivered to the second chamber via a fluid channel extending through the probe holder and wear sole.

In another embodiment, the membrane can be configured to propagate ultrasonic waves emitted by the ultrasonic probe.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Methods, systems, and devices are provided for ultrasonic inspection of pipes and other structures. Current ultrasonic inspection apparatuses typically deliver ultrasonic waves through an ultrasonic couplant and into a pipe, and measure ultrasonic waves reflected from the pipe. Each time the inspection apparatus is moved to a new location, the ultrasonic couplant must be replenished, resulting in a delay. Accordingly, a removable wear sole is provided that retains a fixed amount of ultrasonic couplant within an ultrasonic inspection apparatus, requiring only a small volume of ultrasonic couplant to be replenished when the apparatus is moved. The wear sole can also be easily replaced when sufficiently worn. Other embodiments are within the scope of the disclosed subject matter.

Embodiments of the disclosure are discussed herein with respect to ultrasonic detection of defects in pipes. However, a person skilled in the art will appreciate that the disclosed embodiments can be employed to ultrasonically detect defects in other structures and/or geometries without limit.

Figure 1:
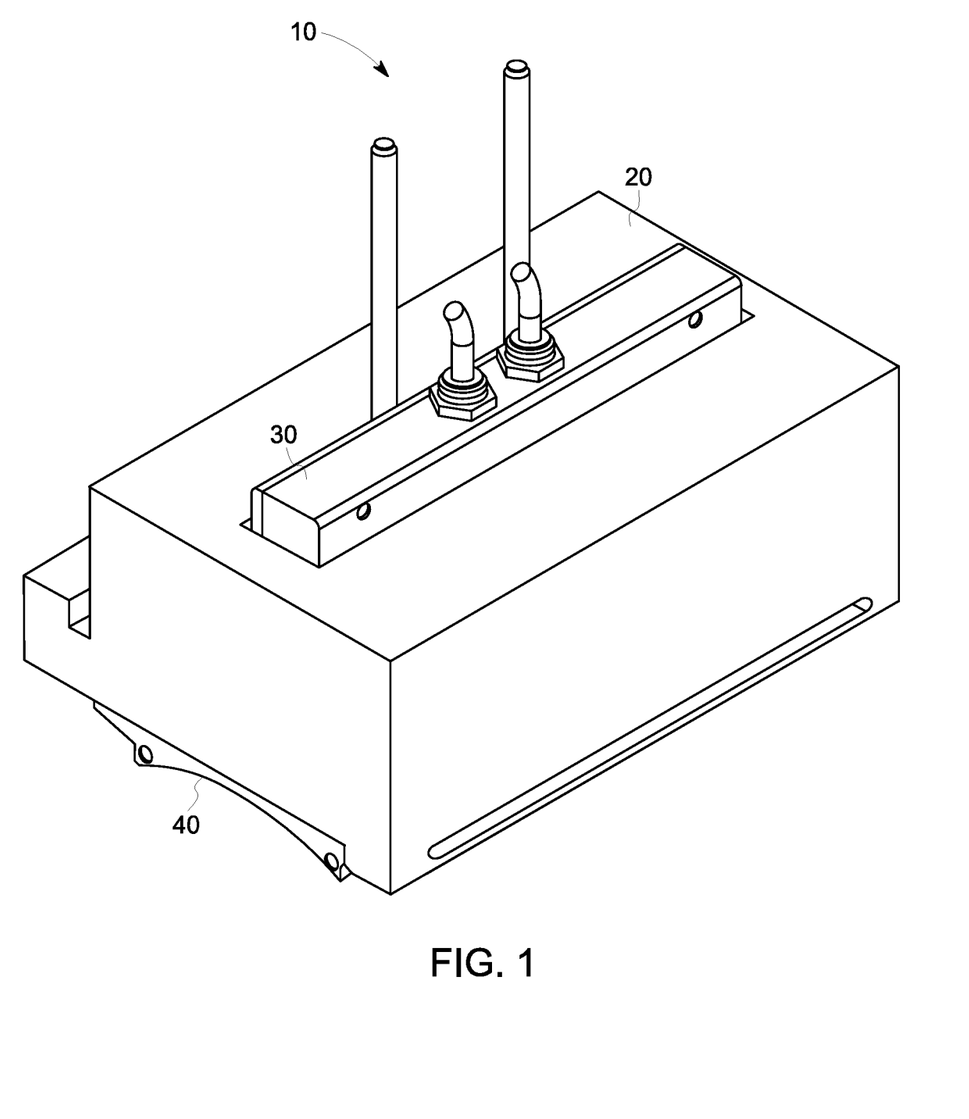
FIG. 1 is a perspective view of one exemplary embodiment of an ultrasonic inspection apparatus including an ultrasonic probe and a probe holder with a removable wear sole.
Figure 2:
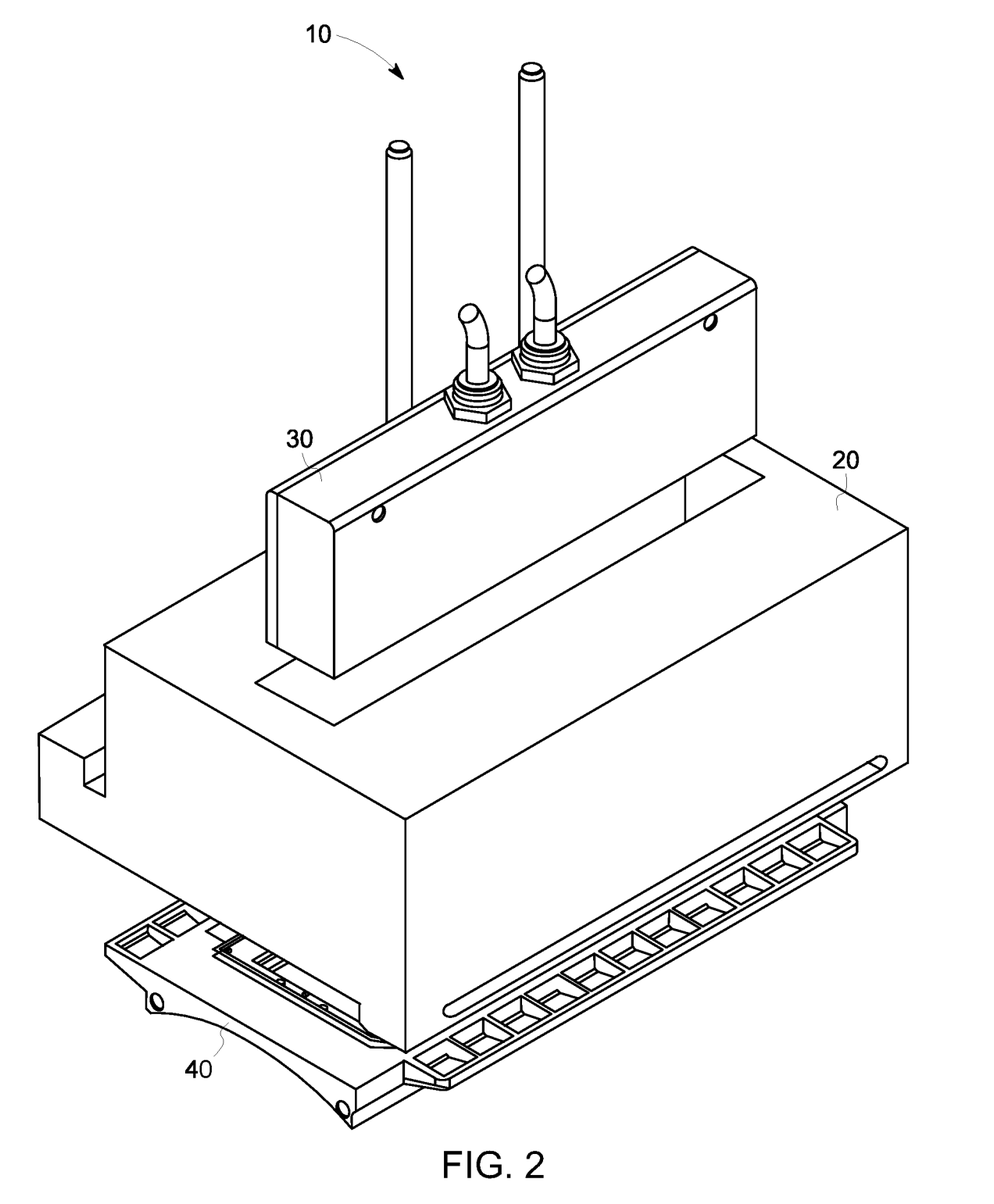
FIG. 2. is a perspective view of the ultrasonic inspection apparatus of FIG. 1 illustrating the ultrasonic probe and wear sole detached from the probe holder.

FIGS. 1-2 illustrate one exemplary embodiment of an ultrasonic inspection apparatus 10. As shown, the ultrasonic inspection apparatus 10 can include a probe holder 20 having an ultrasonic probe 30 and a wear sole 40 mounted thereto. The probe holder 20 can be configured to engage a pipe (not shown) via the wear sole 40 and retain a volume of ultrasonic couplant(s) between the ultrasonic probe 30 and the pipe during inspection. Between inspections, the wear sole 40 can be easily detached from the probe holder for replacement due to wear and accumulation of contaminants (e.g., dirt). As discussed in detail below, the probe holder 20 and wear sole 40 can be configured such that, when the ultrasonic inspection apparatus 10 is moved from one inspected pipe to another, a majority portion of the ultrasonic couplant(s) is retained, while a minority portion is drained. Thus, the time needed to replace the drained ultrasonic couplant(s) is reduced, as compared to replacing all of the ultrasonic couplant(s). Embodiments of the pipe can include any substantially tubular structure formed by any process and material (e.g., steels, copper and copper alloys, aluminum and aluminum alloys, etc.).

Figure 3:
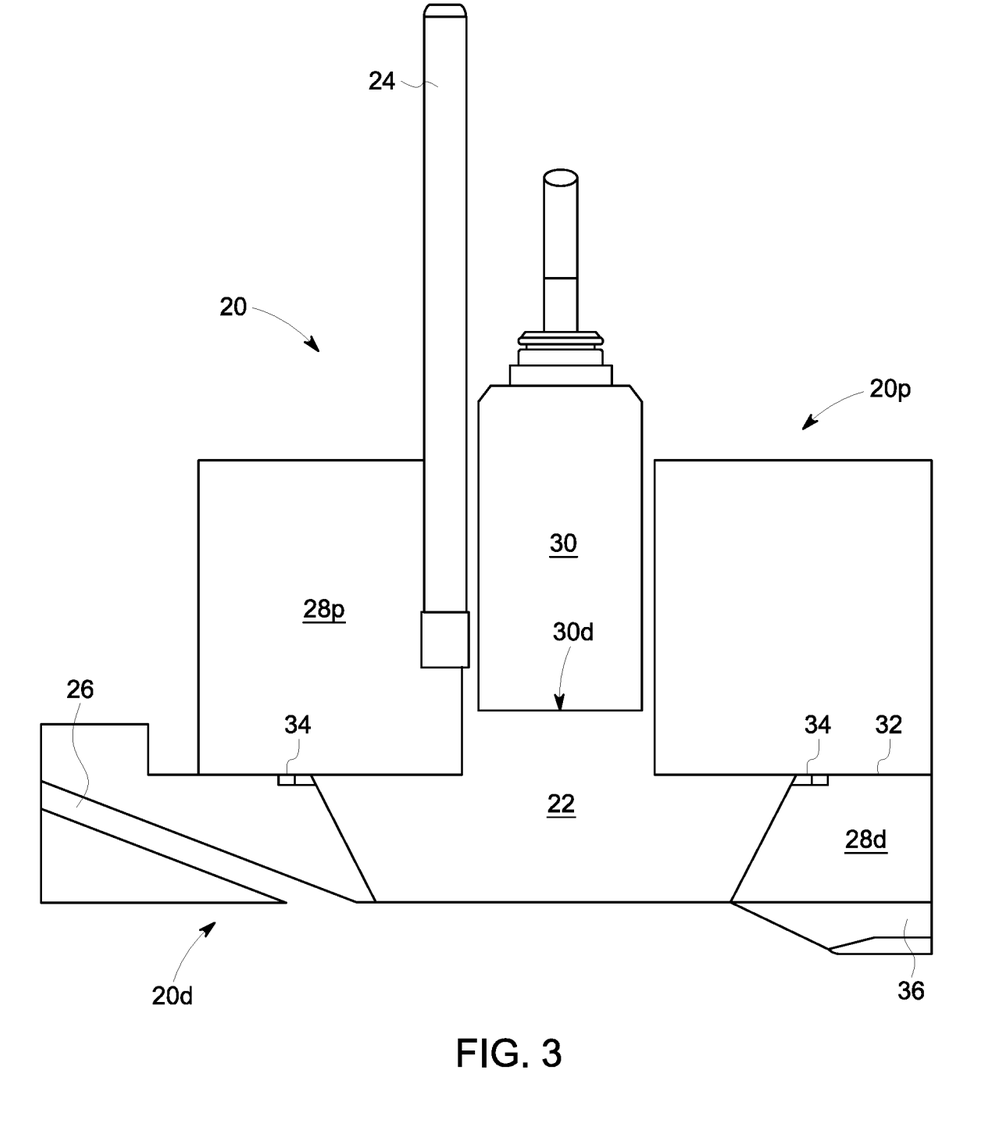
FIG. 3 is a cross-sectional view of the probe holder of FIG. 1.

FIG. 3 is a cross-sectional view illustrating the probe holder 20 and the ultrasonic probe 30 of FIGS. 1-2. As shown, the probe holder 20 can be in the form of a generally rectangular housing or body having a first chamber 22 extending between a proximal end 20p and a distal end 20d. The first chamber 22 can be configured to receive the ultrasonic probe 30 and a first volume of ultrasonic couplant. As shown, a distal end 30d of the ultrasonic probe 30 can be inserted through an opening in the proximal end 20p of the probe holder 20 and secured therein. The distal end 30d of the ultrasonic probe 30 can be positioned within the first chamber 22 at a selected distance from the distal end 20d of the probe holder 20.

The first volume of ultrasonic couplant can be delivered to the first chamber 22 via a first couplant supply 24 (e.g., hoses, pipes, etc.) in fluid communication with the first chamber 22 and a first couplant source (not shown). The first couplant supply 24 can fill the first chamber 22 with the first volume of the first ultrasonic couplant. In FIG. 3, the first couplant supply 24 is illustrated as extending through the proximal end 20p of the probe holder 20. However, in alternative embodiments, the first couplant supply can extend through the probe holder in other directions for fluid communication with the first chamber.

The probe holder 20 can also define a first fluid channel 26 configured to receive a second volume of ultrasonic couplant. The first and second volumes of ultrasonic couplants can be the same ultrasonic couplant or different ultrasonic couplants. As shown, the first fluid channel 26 can extend from a lateral surface of the probe holder 20 to the distal end 20d of the probe holder 20. The first fluid channel 26 can also extend along at least a portion of a length of the probe holder 20. In certain embodiments, the first fluid channel 26 does not fluidly communicate with the first chamber 22. The first fluid channel 26 can be placed in fluid communication with a second ultrasonic couplant source (not shown) and can direct a flow of ultrasonic couplant through the probe holder 20 to the distal end 20d.

In certain embodiments, the probe holder 20 can be formed from multiple components. For example, the probe holder 20 can include a proximal portion 28p sealingly engaged to a distal portion 28d at a joint 32. The joint 32 can include an interface between opposed surfaces of the proximal and distal body portions and one or more seals 34 positioned about the circumference of the first chamber 22 at the interface. The seals 34 can inhibit leakage of the first volume of ultrasonic couplant when retained within the first chamber 22.

Figure 4:
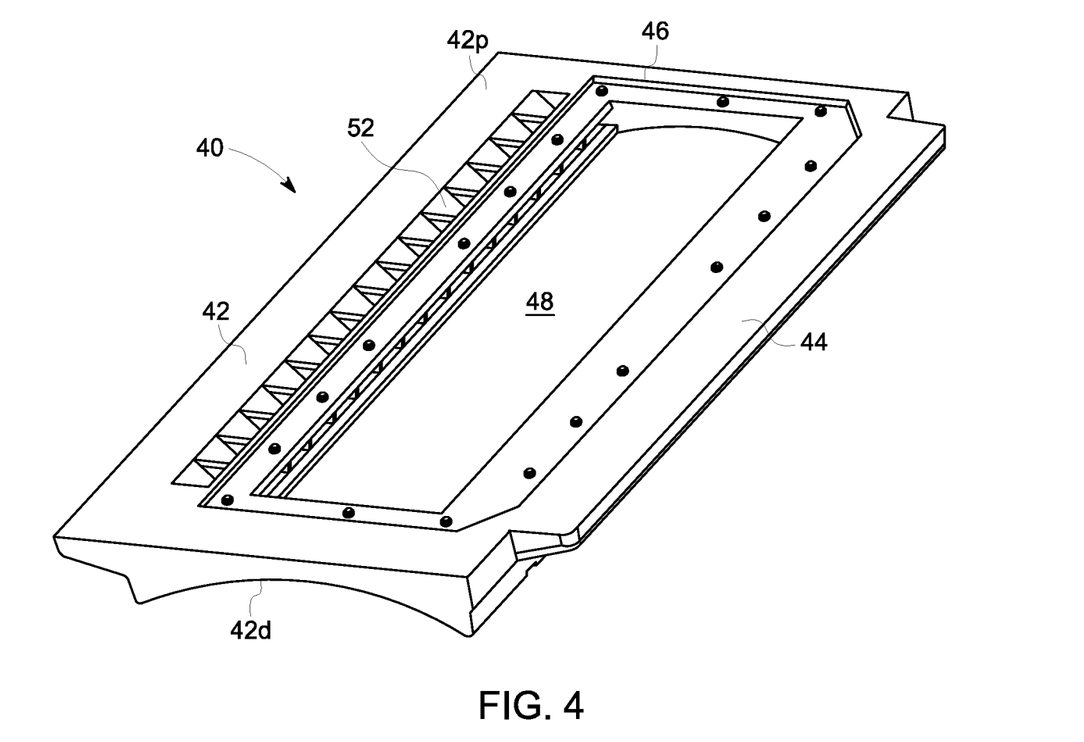
FIG. 4 is a perspective view of the wear sole of FIG. 1.
Figure 5:
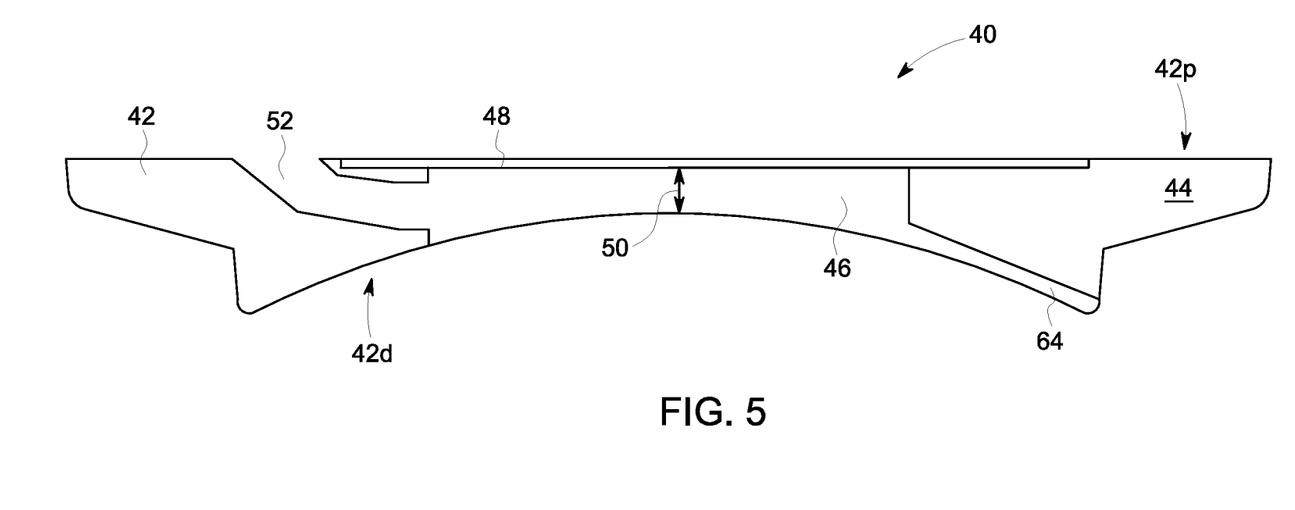
FIG. 5 is a cross-sectional view of the wear sole of FIG. 4.

FIGS. 4-5 illustrate the wear sole 40 in greater detail. In an exemplary embodiment, the wear sole 40 can include a frame 42 (e.g., a generally rectangular frame) having a proximal surface 42p, a distal surface 42d, and an aperture 46 extending therethrough. The proximal surface 42p of the frame 42 can be configured to mate to the distal end 20d of the probe holder 20. The frame 42 can also include a tab 44 extending laterally on and/or adjacent to the proximal surface 42p. The tab 44 can be dimensioned for receipt within a slot 36 formed in the distal end 20d of the probe holder 20. As an example, the tab 44 can be secured within the slot 36 by an interference fit, allowing the wear sole 40 to be quickly engaged or disengaged from the probe holder 20. In alternative embodiments, other mechanisms (e.g., mechanical fasteners, adhesives, etc.) can be employed in place of, or in combination with, the slot 36 and tab 44 for coupling the wear sole 40 to the probe holder 20.

The distal surface 42d of the frame 42 can be configured to engage a pipe. In certain embodiments, the distal surface 42d can have a radius of curvature that is the same, as or approximately equal to, that of a pipe to be inspected. In other embodiments the distal surface 42d can adopt any other shape (e.g., rectilinear, curved, arbitrary, etc.) suitable for mating with a surface of a pipe or other object to be inspected. For example, the wear sole can be a stiff system with respect to one fixed geometry of a test piece or a flexible system as is described in International Patent Publication No. WO 2013/127871, which is incorporated by reference herein in its entirety. While not shown, further embodiments of the frame 42 can include a plurality of recesses formed in the distal surface 42d that retain a wear resistant material therein (e.g., hardened steels, ceramics, etc.) to enhance the durability and service life of the wear sole 40.

The frame 42 can also include a membrane 48 positioned within the aperture 46. In certain embodiments, the membrane 48 can be proximally offset from the distal surface 42d of the frame 42 (e.g., flush mounted with respect to the proximal surface 42p) and can define a second chamber 50 distal to the membrane 48. As shown, the second chamber 50 can be bounded by side walls of the aperture 46 and bounded proximally by the membrane 48. That is, the second chamber 50 can be open to the distal surface 42d of the frame 42. The membrane 48 can also seal the second chamber 50 from the first chamber 22 when the wear sole 40 is coupled to the probe holder 20.

This configuration of the inspection apparatus 10 can significantly reduce the time required for ultrasonic inspection. As discussed in greater detail below, when the inspection apparatus 10 is moved from one inspection location to another, the first volume of ultrasonic couplant received within the first chamber 22 can be retained within the first chamber 22 rather than being drained from the first chamber 22. Thus, only ultrasonic couplant received within the second chamber 22 (e.g., a second volume of ultrasonic couplant) is drained and refilled between ultrasonic inspection runs performed at different test locations. As a result, a refilling time between ultrasonic inspection runs can be reduced.

In certain embodiments, the membrane 48 can be formed from a material having selected acoustic and/or mechanical properties. As an example, the membrane 48 can be formed from a material whose acoustic impedance is matched with ultrasonic couplant(s) in contact with the membrane 48 to minimize reflections and absorptions at interfaces between the membrane and ultrasonic couplant(s). In certain exemplary embodiments, the membrane material can be a material that is invisible or near invisible when used with a selected couplant, such that the material does not reflect ultrasound from the surface and does not absorb ultrasound when the waves pass therethrough, or at least minimizes reflection and absorption. In further embodiments, the membrane 48 can be formed from a mechanically rigid material. It can be desirable for the membrane 48 to be substantially rigid, undergoing less than a selected amount of deflection in response to forces exerted upon the membrane 48 due to ultrasonic couplant(s) in service (e.g., fluid flow pressure, force of gravity, etc.). Accordingly, the membrane 48 can possess an elastic modulus that limits the deflection of the membrane 48 to less than the selected amount.

By way of non-limiting example, suitable membrane materials include, but are not limited to, polymers, polymer blends, and rubber materials, such as polyethylene, polypropylene, polyvinylchloride, polystyrol, polytetrafluorethylene, polymethylmethacrylat, polyacrylnitril, polyacrylamide, aramides, polyetherketones, polyethylenglycol, polyurethane, silicons or poly(organo)siloxane, thermoplastic elastomers, melamine resin, polyacrylate rubber, ethylene-acrylate rubber, polyester urethane, bromo isobutylene isoprene, polybutadiene, chloro isobutylene isoprene, polychloroprene, chlorosulphonated polyethylene, epichlorohydrin, ethylene propylene, ethylene propylene diene monomer, polyether urethane, perfluorocarbon rubber, fluoronated hydrocarbon, fluoro silicone, fluorocarbon rubber, hydrogenated nitrile butadiene, polyisoprene, isobutylene isoprene butyl, acrylonitrile butadiene, butyl rubber, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, and styrene butadiene carboxy block copolymer. One exemplary membrane material is Aqualene™, manufactured by Innovation Polymers of Kitchener, Ontario, Canada.

The frame 42 can also be configured to receive an ultrasonic couplant and deliver the ultrasonic couplant to the second chamber 50. The second chamber 50 can be in fluid communication with a second fluid channel 52 extending through the frame 42 (e.g., from the proximal surface 42p of the frame 42 to the second chamber 50). The second fluid channel 52 can extend along at least a portion of the length of the aperture 46. When the second fluid channel 52 is placed in fluid communication with a source of the second ultrasonic couplant (not shown), the second volume of ultrasonic couplant can flow therethrough to fill the second chamber 50.

Figure 6A:
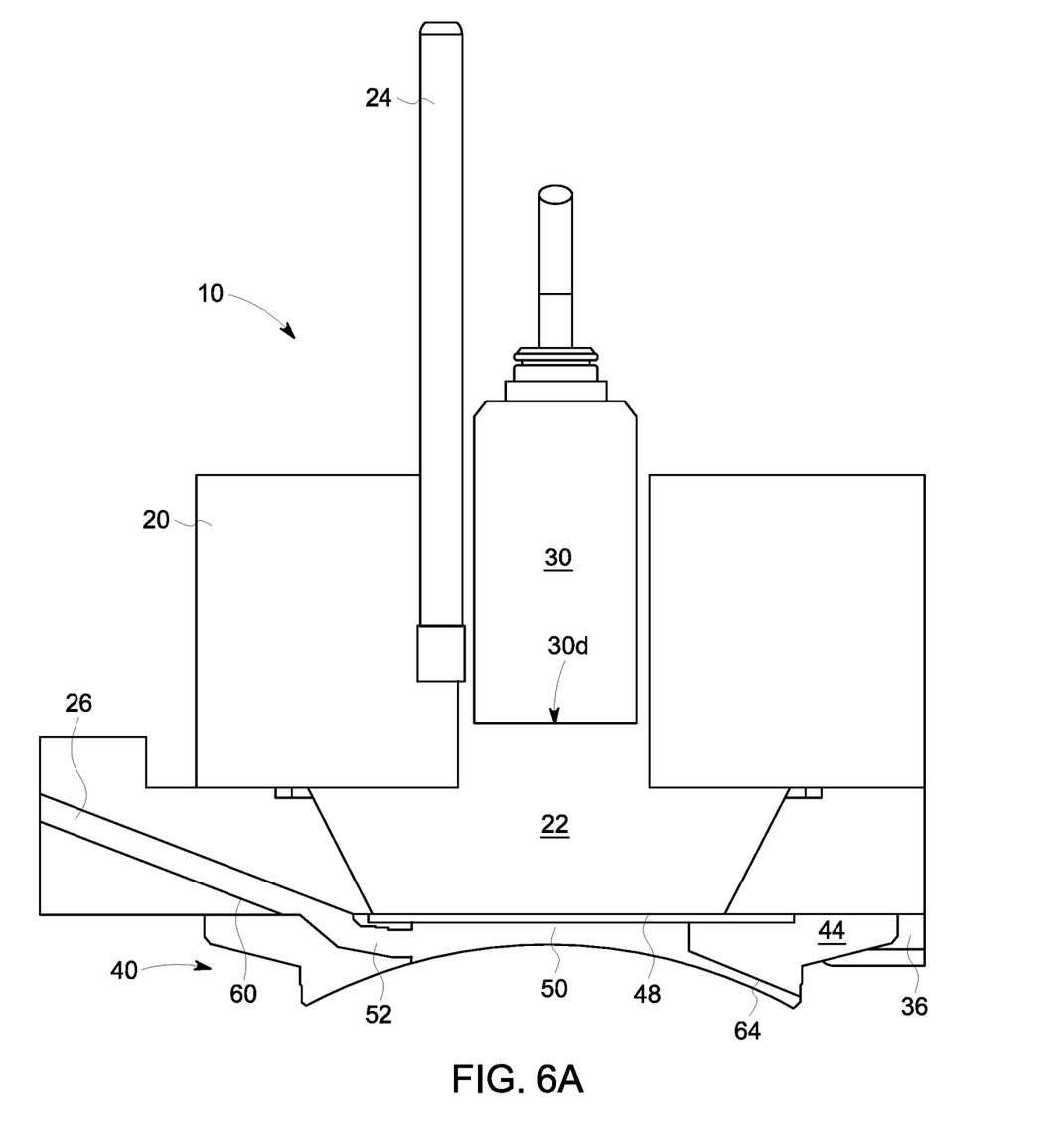
FIGS. 6A and 6B are cross-sectional views of the ultrasonic inspection apparatus of FIG. 1.

FIG. 6A illustrates a cross-sectional view of the ultrasonic inspection apparatus 10 with the wear sole 40 coupled to the probe holder 20. As shown, the tab 44 of the wear sole 40 can extend within the slot 36 of the probe holder 20 to removably couple the wear sole 40 to the probe holder 20. Coupled in this manner, various features of the probe holder 20 and the wear sole 40 can be aligned with respect to one another to facilitate use. When the ultrasonic probe 30 is mounted to probe holder 20 within the first chamber 22, the distal end 30d of the ultrasonic probe 30 can be positioned at a fixed distance and orientation with respect to the wear sole 40. This mounting can provide a line of sight from the distal end 30d of the ultrasonic probe 30 to the distal surface 42d of the frame 42, through the membrane 48, without obstruction from the probe holder 20 or the frame 42. In another aspect, ends of the first and second fluid channels 26, 52 can be aligned across opposed surfaces of the probe holder 20 and the wear sole 40 to form a continuous fluid delivery channel 60. The fluid delivery channel 60 can allow an ultrasonic couplant to flow within the probe holder 20 and the frame 42 of the wear sole 40 to fill the second chamber 50.

Figure 6B:
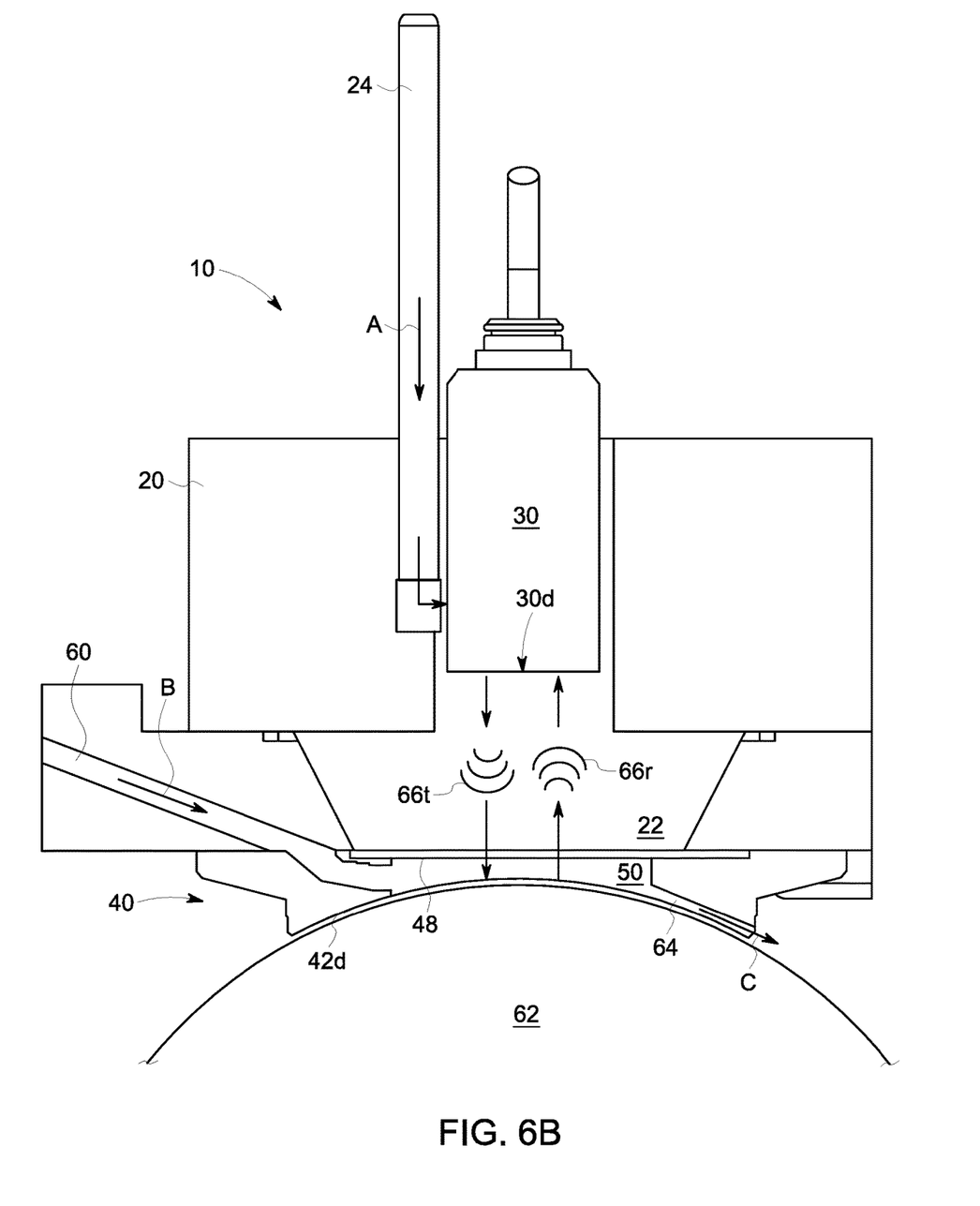

FIG. 6B illustrates a cross-sectional view of the ultrasonic inspection apparatus 10 positioned on a pipe 62 for performing an ultrasonic inspection. As shown, the distal surface 42d of the frame 42 of the wear sole 40 can be placed in contact with an outer surface of the pipe 62, distancing the distal end 30d of the ultrasonic probe 30 from an outer surface of the pipe 62. The first chamber 22 can be filled with the first volume of ultrasonic couplant via the first couplant supply 24 (arrow A) and the second chamber 50 can be filled with the second volume of ultrasonic couplant via the fluid delivery channel 60 (arrow B). When the distal end 20d of the probe holder 20 is sealingly engaged by the membrane 48, the first volume of ultrasonic couplant filling the first chamber 22 ($V_1$) can be substantially constant during inspection and movement of the ultrasonic inspection apparatus 10. In contrast to the first chamber 22, the second chamber 50 can be open to the distal surface 42d of the frame 42 and the pipe 62. When the distal surface 42d of the frame 42 is positioned on the pipe 62, the second chamber 50 becomes distally bounded and the second volume of ultrasonic couplant received within the second chamber 50 ($V_2$) can flow into contact with the outer surface of the pipe 62.

Under the influence of gravity and/or flow pressure, the second volume of ultrasonic couplant can also flow out of the second chamber 50 via a third fluid channel 64 (arrow C). The third fluid channel 64 can be formed in the distal surface 42d of the frame 42 and positioned laterally opposite the second fluid channel 52. In certain embodiments (not shown), the third fluid channel can be formed with two or more slots. As an example, each of the slots can have approximately the same width.

Thus, an ultrasonic couplant received within the second fluid channel 52 can flow laterally through one side of the frame 42 including the second fluid channel 52, through the second chamber 50, and through to the opposite side of the frame 42 including the third fluid channel 64. To maintain the volume of the second chamber 50 ($V_2$) filled with the second volume of ultrasonic couplant, a continuous flow of ultrasonic couplant can be delivered to the second chamber 50 via the fluid delivery channel 60. In this manner, an optimized flow path can be formed by the first channel 26, the second channel 52, and the third channel 64 in combination with the second chamber 50.

Alternatively or additionally, the cross-sectional area of the second fluid channel 52 can be larger than the cross-sectional area of the third fluid channel 64. This configuration can facilitate retention of the second volume of ultrasonic couplant within the second chamber 50, as fluid flow out of the second chamber 50 is restricted relative to fluid flow into the second chamber.

Once the first and second chambers 22, 50 are filled with the first and second volumes of ultrasonic couplants, respectively, the ultrasonic probe 30 can transmit ultrasonic waves towards the pipe for inspection. Ultrasonic waves 66t transmitted by the ultrasonic probe 30 can propagate through the first volume of ultrasonic couplant within the first chamber 22, through the membrane 48, and through the second volume of ultrasonic couplant within the second chamber 50 to the pipe 62. At the pipe 62, ultrasonic waves 66r can be reflected from surface and/or internal boundaries of the pipe 62 back towards the ultrasonic probe 30, propagating through the second volume of ultrasonic couplant within the second chamber 50, the membrane 48, and the first volume of ultrasonic couplant within the first chamber 22. At the ultrasonic probe 30, characteristics of the reflected ultrasonic waves 66r can be measured (e.g., amplitude, propagation time, etc.) and transmitted to a computing device for storage and/or analysis for detection of defects within the pipe 62.

After the ultrasonic probe 30 has completed acquiring measurements for one pipe, the ultrasonic inspection apparatus 10 can be removed from contact with the pipe 62 and/or repositioned relative to the pipe 62. The second volume ultrasonic couplant ($V_2$) can drain from the second chamber 50, through the open distal surface 42d of the frame 42 when the pipe 62 is removed, while the first of ultrasonic couplant ($V_1$) within the first chamber 22 can be retained. The first and second chambers 22, 50 can be configured such that the volume $V_1$ is greater than the volume $V_2$ so that the first volume of ultrasonic couplant occupies the majority of the path through which the ultrasonic waves 66t, 66r travel between the distal end 30d of the ultrasonic probe 30 and the pipe 62. As an example, the ratio of $V_1$ to $V_2$ can be in the range of about 2 to 1, 3 to 1, 4 to 1, 5 to 1, 10 to 1, 20 to 1, 30 to 1, 40 to 1, etc. In a non-limiting example, the ratio of $V_1$ to $V_2$ can be in the range of about 34 to 1. Thus, when the ultrasonic inspection apparatus 10 is disengaged from a pipe and engaged with another pipe, the second volume of ultrasonic couplant within the second chamber 50 ($V_2$) is drained and the first volume of ultrasonic couplant within the first chamber 22 ($V_1$) is retained, reducing the filling time needed to prepare the ultrasonic inspection apparatus 10 for inspection of the next pipe as compared to a circumstance in which the first and second volumes of ultrasonic couplants ($V_1+V_2$) of both the first and second chambers 22, 50 are drained.

Figure 7:
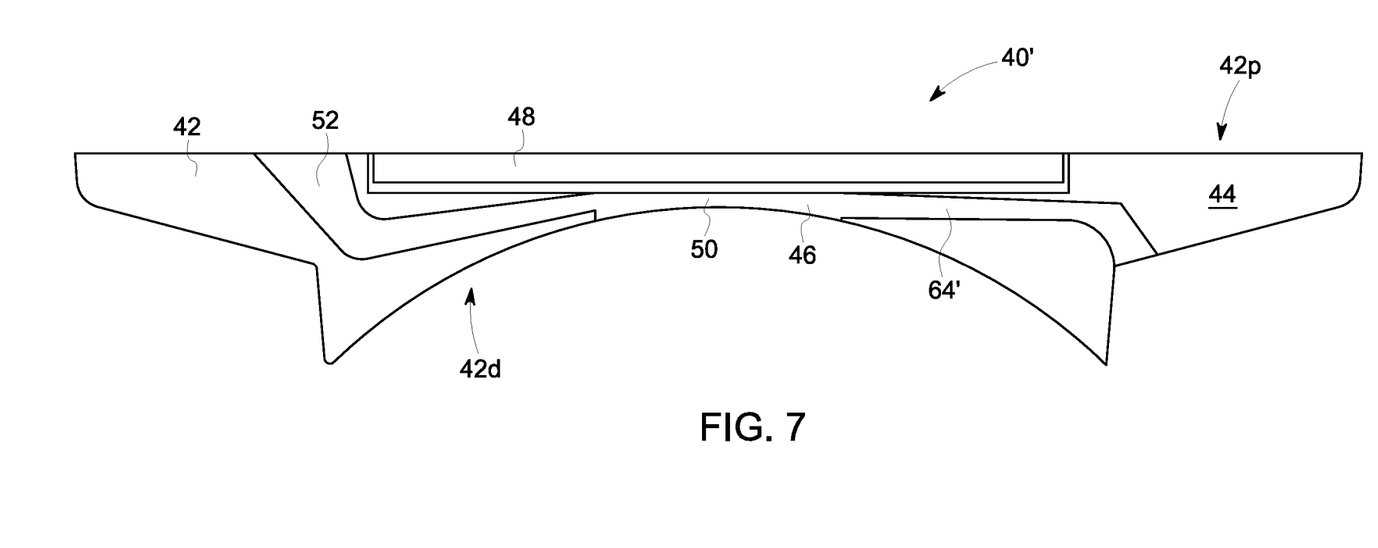
FIG. 7 is a cross-sectional view of another exemplary embodiment of a removable wear sole.

FIG. 7 is diagram illustrating an another exemplary embodiment of the removable wear sole 40 in the form of removable wear sole 40'. The wear sole 40' can be similar to wear sole 40, except that the third fluid channel 64 is replaced with third fluid channel 64'. Like the third fluid channel 64 of wear sole 40, the third fluid channel 64' of the wear sole 40' can be in fluid communication with the second chamber 50 and the distal surface 42d of the frame 42. Thus, the functionality and advantages discussed herein with respect to the third fluid channel 64 are also applicable to the third fluid channel 64'. However, in contrast to the third fluid channel 64, which can be formed in the distal surface 42d of the frame 42, the third fluid channel 64' can be formed within the bulk of the frame 42, where the terminal ends of the third fluid channel 64' can be in fluid communication with the second chamber 50 and the distal surface 42d of the frame 42.

Forming the third fluid channel 64' through the bulk of the frame 42 can be advantageous in operating environments where the wear sole is expected to undergo significant wear. Wear experienced by the wear sole can substantially remove some of the proximal facing surface 42d of the frame 42. If the extent of this wear is extreme, it can potentially cause removal of a portion of the third fluid channel 64 and compromise the ability of the third fluid channel 64 to guide fluid exiting the second chamber 50. In contrast, forming the third fluid channel 64' through the bulk of the frame 42 can substantially avoid this issue.

Figure 8:
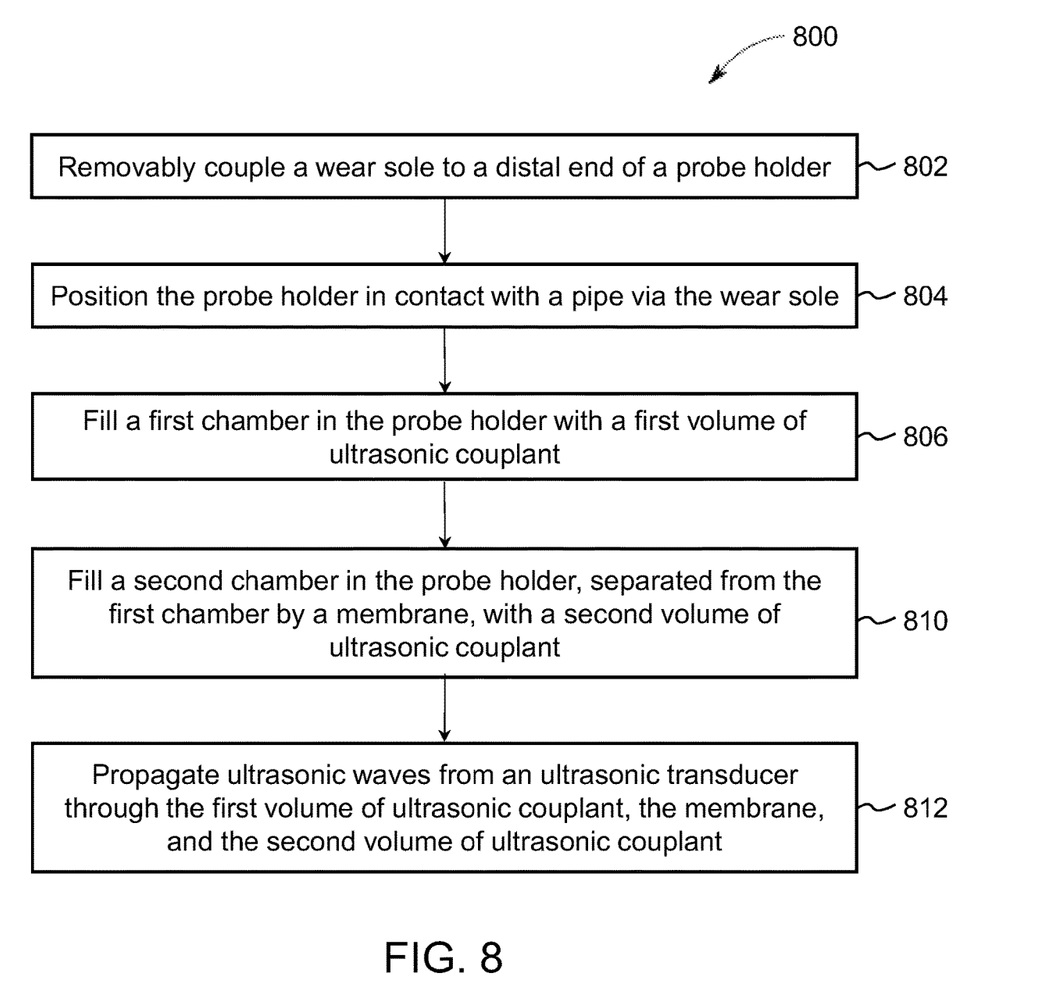
FIG. 8 is a flow diagram illustrating one exemplary embodiment of a method of ultrasonic inspection.

FIG. 8 is a flow diagram illustrating an exemplary embodiment of a method 800 for ultrasonic inspection. Embodiments of the method 800 are described below with reference to inspection apparatus 10. In certain aspects, embodiments of the method 800 can include greater or fewer operations than illustrated in FIG. 8 and can be performed in a different order than illustrated in FIG. 8.

In operation 802, a wear sole (e.g., 40, 40') can be removably coupled to a distal end (e.g., 20d) of a probe holder (e.g., 20).

In operation 804, the probe holder 20 can be positioned in contact with a pipe (e.g., 62) via the wear sole 40, 40'.

In operation 806, a first chamber (e.g., 22) of the probe holder 20 can be filled with a first volume of an ultrasonic couplant.

In operation 810, a second chamber (e.g., 50) can be filled with a second volume of ultrasonic couplant. The second chamber 50 can extend between the wear sole 40, 40' and the pipe 62. As an example, the wear sole 40, 40' can include a membrane (e.g., 48) that separates the first chamber 22 from the second chamber 50 and the second chamber 50 can extend from the membrane 48 and the pipe 62. The second volume of ultrasonic couplant can also be in fluid contact with the pipe 62. In certain embodiments, the second volume of fluid couplant can be delivered to the second chamber 50 by a fluid channel (e.g., 60) extending through the probe holder 20 and the wear sole 40, 40'.

The first and second volumes of ultrasonic couplant can have a variety of configurations. In one aspect, the first volume of ultrasonic couplant in the first chamber 22 can be greater than the second volume of ultrasonic couplant in the second chamber 50. In another aspect, the first volume of ultrasonic couplant can be approximately constant, while the second volume of ultrasonic couplant can be continuously delivered to the second chamber 50 to fill the second chamber 50.

In operation 812, ultrasonic waves generated by an ultrasonic transducer (e.g., 30) can be propagated through the first volume of ultrasonic couplant, through the membrane 48, and through the second volume of ultrasonic couplant to the pipe. The membrane 48 can be configured to propagate ultrasonic waves emitted by the ultrasonic probe 30. That is, the membrane 48 can be substantially transparent to ultrasonic waves.

Optionally, the method can also include removing a first wear sole from the probe holder and replacing the first wear sole with a second wear sole. The first and second wear soles can be substantially the same, except for wear experienced by the first wear sole during use.

Exemplary technical effects of the methods, systems, and devices described herein include, by way of non-limiting example, the ability to direct ultrasonic couplants from a probe holder through a wear sole of an ultrasonic inspection apparatus, a reduction in inspection delays arising from replacement of drained ultrasonic couplants, and rapid replacement of the wear sole.

Certain exemplary embodiments have been described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A wear sole for ultrasonic inspection, comprising:
a frame configured to removably mate to a probe holder body, the frame having
an aperture extending therethrough between a proximal facing surface and a distal facing surface,
a membrane positioned within the aperture and configured to propagate ultrasonic waves therethrough,
a fluid delivery channel formed therein for delivering an ultrasonic couplant to a portion of the aperture distal to the membrane; and
a lateral tab configured to engage a corresponding slot in the probe holder body;
wherein the fluid delivery channel is configured to direct a flow of the ultrasonic couplant from a first side of the frame to a second side of the frame opposite to the first side of the frame, the ultrasonic couplant exiting the frame at the second side of the frame.

2. The wear sole of claim 1, wherein a distal facing surface of the frame is configured to mate with a pipe.

3. The wear sole of claim 1, wherein the frame is configured to direct the flow of ultrasonic couplant along at least a portion of the length of the aperture.

4. The wear sole of claim 1, wherein the membrane is proximally offset from a distal facing surface of the frame.

5. A method of ultrasonic inspection, comprising:
removably coupling a wear sole to a distal end of a probe holder via engagement a lateral tab of the wear sole with a corresponding slot in the probe holder;
positioning the probe holder in contact with a pipe via the wear sole;
filling a first chamber in the probe holder with a first volume of ultrasonic couplant;
filling a second chamber extending between the wear sole and the pipe with a second volume of ultrasonic couplant via a fluid channel extending through the probe holder and the wear sole, the first and second chambers being separated by a membrane positioned within an aperture of a frame of the wear sole, and the second volume of ultrasonic couplant being in fluid contact with the pipe; and
propagating ultrasonic waves from an ultrasonic transducer in the probe holder, through the first volume of ultrasonic couplant, through the membrane, and through the second volume of ultrasonic couplant to the pipe;
wherein the fluid channel is configured to direct a flow of the second volume of ultrasonic couplant from a first side of the wear sole to a second side of the wear sole opposite to the first side of the wear sole, the ultrasonic couplant exiting the wear sole at the second side of the wear sole.

6. The method of claim 5, further comprising removing and replacing the wear sole with a new wear sole having a membrane positioned within an aperture of a frame of the new wear sole for separating the first and second chambers.

7. The method of claim 5, wherein the membrane is configured to propagate ultrasonic waves emitted by the ultrasonic probe.

8. The method of claim 5, wherein the first volume of ultrasonic couplant in the first chamber is greater than the second volume of ultrasonic couplant in the second chamber.

9. The method of claim 5, wherein the first volume of ultrasonic couplant in the first chamber remains substantially constant and wherein the second volume of ultrasonic couplant is continuously delivered to the second chamber to fill the second chamber.

10. The wear sole of claim 1, wherein the membrane is flush mounted with respect to the proximal facing surface of the frame.

11. The wear sole of claim 1, wherein the fluid delivery channel is configured to receive the ultrasonic couplant from a fluid channel formed in the probe holder body.

* * * * *